(12) United States Patent
Lee et al.

(10) Patent No.: US 10,988,582 B2
(45) Date of Patent: Apr. 27, 2021

(54) SUPER ABSORBENT POLYMER AND METHOD FOR PREPARING SAME

(71) Applicant: LG Chem, Ltd., Seoul (KR)

(72) Inventors: Hyemin Lee, Daejeon (KR); Sung Jong Seo, Daejeon (KR); Hyung Ki Yoon, Daejeon (KR)

(73) Assignee: LG Chem, Ltd.

( * ) Notice: Subject to any disclaimer, the term of this patent is extended or adjusted under 35 U.S.C. 154(b) by 454 days.

(21) Appl. No.: 15/767,903

(22) PCT Filed: Jan. 3, 2017

(86) PCT No.: PCT/KR2017/000054
§ 371 (c)(1),
(2) Date: Apr. 12, 2018

(87) PCT Pub. No.: WO2017/171208
PCT Pub. Date: Oct. 5, 2017

(65) Prior Publication Data
US 2018/0312645 A1  Nov. 1, 2018

(30) Foreign Application Priority Data

Mar. 31, 2016 (KR) .................. 10-2016-0039244
May 24, 2016 (KR) .................. 10-2016-0063524

(51) Int. Cl.
| | | |
|---|---|---|
| C08J 3/075 | (2006.01) | |
| C08J 3/12 | (2006.01) | |
| C08J 3/24 | (2006.01) | |
| C08K 3/36 | (2006.01) | |
| C08K 5/1565 | (2006.01) | |
| C08F 6/00 | (2006.01) | |
| C08L 33/02 | (2006.01) | |
| C08F 220/06 | (2006.01) | |

(52) U.S. Cl.
CPC .............. *C08J 3/075* (2013.01); *C08F 6/008* (2013.01); *C08F 220/06* (2013.01); *C08J 3/12* (2013.01); *C08J 3/245* (2013.01); *C08J 3/247* (2013.01); *C08K 3/36* (2013.01); *C08K 5/1565* (2013.01); *C08L 33/02* (2013.01); *C08J 2333/02* (2013.01)

(58) Field of Classification Search
CPC ..... C08J 3/24; C08J 3/245; B01J 20/26; B01J 20/267
See application file for complete search history.

(56) References Cited

U.S. PATENT DOCUMENTS

| | | | |
|---|---|---|---|
| 7,285,599 B2 | 10/2007 | Mertens et al. | |
| 7,638,570 B2 * | 12/2009 | Torii | A61L 15/60 524/430 |
| 8,445,596 B2 | 5/2013 | Mertens et al. | |
| 9,486,778 B2 * | 11/2016 | Ryu | B01J 20/30 |
| 9,624,328 B2 * | 4/2017 | Won | C08F 220/06 |
| 9,849,439 B2 * | 12/2017 | Lee | C08J 3/245 |
| 10,285,866 B2 * | 5/2019 | Ryu | C08F 220/06 |
| 10,300,458 B2 * | 5/2019 | Torii | B01J 20/28016 |
| 2006/0029782 A1 | 2/2006 | Harren et al. | |
| 2006/0204755 A1 | 9/2006 | Torii et al. | |
| 2007/0100304 A1 | 5/2007 | Fell et al. | |
| 2007/0123658 A1 | 5/2007 | Torii et al. | |
| 2009/0131255 A1 | 5/2009 | Ikeuchi et al. | |
| 2009/0227741 A1 | 9/2009 | Walden et al. | |
| 2013/0026412 A1 | 1/2013 | Machida et al. | |
| 2013/0172180 A1 | 7/2013 | Naumann et al. | |
| 2015/0210843 A1 | 7/2015 | Kimura et al. | |
| 2015/0225514 A1 | 8/2015 | Kimura et al. | |
| 2015/0315321 A1 | 11/2015 | Won et al. | |
| 2016/0151531 A1 | 6/2016 | Lee et al. | |
| 2016/0199527 A1 | 7/2016 | Ota et al. | |
| 2016/0214082 A1 | 7/2016 | Lee et al. | |
| 2016/0311985 A1 | 10/2016 | Jung et al. | |
| 2017/0073478 A1 | 3/2017 | Joo et al. | |
| 2017/0189575 A1 | 7/2017 | Lee et al. | |

FOREIGN PATENT DOCUMENTS

| | | |
|---|---|---|
| CN | 1747751 A | 3/2006 |
| EP | 3156427 A1 | 4/2017 |
| EP | 3342801 A1 | 7/2018 |
| EP | 3345958 A1 | 7/2018 |

(Continued)

OTHER PUBLICATIONS

Search Report from Chinese Office Action for CN2017800036486 dated Apr. 10, 2020; 2 pages.
International Search Report for Application No. PCT/KR2017/000054 dated Apr. 10, 2017.
Odian, George, "Principle of Polymerization." Second Edition, (Wiley, 1981), p. 203.
Schwalm, Reinhold, "UV Coatings: Basics, Recent Developments and New Applications." Elsevier Science, Dec. 21, 2006, p. 115.

(Continued)

Primary Examiner — Yong L Chu
(74) Attorney, Agent, or Firm — Lerner, David, Littenberg, Krumholz & Mentlik, LLP

(57) ABSTRACT

The present invention relates to a super absorbent polymer exhibiting more improved liquid permeability while maintaining excellent absorption performance, and a method for producing the same. The super absorbent polymer comprises: a base polymer powder comprising a first cross-linked polymer of a water-soluble ethylenically unsaturated monomer having at least partially neutralized acidic groups; and a surface crosslinked layer formed on the base polymer powder and including a second cross-linked polymer in which the first crosslinked polymer is further cross-linked through an alkylene carbonate having two to five carbon atoms. The super absorbent polymer satisfies predetermined physical properties.

15 Claims, No Drawings

(56) References Cited

FOREIGN PATENT DOCUMENTS

| | | |
|---|---|---|
| JP | 2001137704 A | 5/2001 |
| JP | 4806191 B2 | 11/2011 |
| JP | 2014079324 A | 5/2014 |
| JP | 5676572 B2 | 2/2015 |
| KR | 100819613 B1 | 4/2008 |
| KR | 20120081113 A | 7/2012 |
| KR | 20140107491 A | 9/2014 |
| KR | 101471982 B1 | 12/2014 |
| KR | 20150016126 A | 2/2015 |
| KR | 20150056571 A | 5/2015 |
| KR | 20150056572 A | 5/2015 |
| KR | 20150059454 A | 6/2015 |
| KR | 20150067729 A | 6/2015 |
| KR | 20150088219 A | 7/2015 |
| KR | 20150142636 A | 12/2015 |
| KR | 101586383 B1 | 1/2016 |
| KR | 20160016714 A | 2/2016 |
| WO | 2004069915 A2 | 8/2004 |
| WO | WO-2016052537 A1 * | 4/2016 .............. C08J 3/245 |

OTHER PUBLICATIONS

Extended European Search Report including Written Opinion for EP17775633.5 dated Nov. 28, 2018.
Third Party Observation for PCT/KR2017/000054 dated Aug. 10, 2018.

* cited by examiner

SUPER ABSORBENT POLYMER AND METHOD FOR PREPARING SAME

CROSS-REFERENCE TO RELATED APPLICATIONS

The present application is a national phase entry under 35 U.S.C. § 371 of International Application No. PCT/KR2017/000054 filed Jan. 3, 2017, which claims priority from Korean Patent Application No. 10-2016-0039244, filed on Mar. 31, 2016 and Korean Patent Application No. 10-2016-0063524, filed on May 24, 2016, the disclosures of which are incorporated herein by reference.

TECHNICAL FIELD

The present invention relates to a super absorbent polymer exhibiting more improved liquid permeability while maintaining excellent absorption performance, and a preparation method thereof.

BACKGROUND

Super absorbent polymer (SAP) is a synthetic polymer material capable of absorbing moisture from about 500 to about 1,000 times its own weight, and each manufacturer has denominated it as different names such as SAM (Super Absorbency Material), AGM (Absorbent Gel Material) or the like. Such super absorbent polymers started to be practically applied in sanitary products, and now they are widely used for preparation of various products, for example, hygiene products such as paper diapers for children or sanitary napkins, water retaining soil products for gardening, water stop materials for the civil engineering and construction, sheets for raising seedling, fresh-keeping agents for food distribution fields, materials for poultice or the like.

In most cases, these super absorbent polymers have been widely used in the field of hygienic materials such as diapers or sanitary napkins. For these applications, the super absorbent polymer should exhibit a high moisture absorbency, it should not release the absorbed water even in the external pressure, and additionally it should well retain the shape even in a state where the volume is expanded (swelled) by absorbing water, and thereby exhibit excellent liquid permeability.

In particular, in recent years, studies have been conducted to provide diapers having a thinner thickness. Accordingly, interests have been growing in so-called pulpless diapers in which the content of pulp is greatly reduced compared with existing diapers, or further, the super absorbent polymer is immobilized via another means such as tacky/adhesive agents without using pulp. As for the pulpless diapers in which pulp content is greatly reduced or pulp is not used as described above, it is known that application of a super absorbent polymer exhibiting more improved liquid permeability and gel strength than previously known is necessary.

This is because, basically, in order for the pulpless diaper, in which the content of pulp is reduced or the use of pulp is excluded, to have an excellent wearing feeling from the user's point of view, the super absorbent polymer contained therein needs to exhibit higher liquid permeability.

Further, in this type of diaper, the content of pulp for buffering/protecting super absorbent polymer particles from the external impact is reduced or the pulp itself is excluded. Thus, in order for the super absorbent polymer to maintain excellent physical properties and shape despite an external impact, it is necessary for the polymer itself to have higher gel strength.

Furthermore, in order for the super absorbent polymer to exhibit and maintain the above-mentioned high liquid permeability, even after the super absorbent polymer particles are swollen by absorbing moisture, the super absorbent polymer needs to be retained in its shape, thereby maintaining voids between particles. This is because voids between the particles act as a flow path to ensure excellent liquid permeability of the super absorbent polymer. For this reason, in order to provide a super absorbent polymer exhibiting more improved liquid permeability and other excellent physical properties as described above, such a super absorbent polymer needs to exhibit a higher gel strength.

Due to the tendency of the diaper development as described above and the characteristics of the super absorbent polymer required therefor, interests have recently been more concentrated on improving the gel strength and the liquid permeability of the super absorbent polymer. However, when it is tried to increase the gel strength of the super absorbent polymer, it is generally known that the basic absorption capacity of the super absorbent polymer is lowered. Thus, there are technical difficulties in improving gel strength and liquid permeability while maintaining the absorption capacity to the maximum, and research for solving these defects has been continued.

Due to the above-described technical requirements, various attempts have been made to improve the liquid permeability and the gel strength of the super absorbent polymer. As a typical example thereof, there may be mentioned a method of adding, to a surface cross-linked super absorbent polymer, a water-soluble polyvalent metal compound, an insoluble inorganic fine particle or a cationic polymer compound as an additive for improving liquid permeability.

However, even with these conventional methods, the liquid permeability and gel strength of the super absorbent polymer are not sufficient, and further, it is true that, as the additive become detached from the surface of the super absorbent polymer particles with time, the liquid permeability tends to be greatly lowered. In addition, when the above-mentioned conventional method is applied, there was a problem that the basic absorption capacity such as the absorbency under pressure is lowered despite the improvement in liquid permeability.

Therefore, there is a continuing need to develop a technique capable of providing a super absorbent polymer having more improved liquid permeability and gel strength while maintaining excellent absorption performance.

Technical Problem

The present invention provides a super absorbent polymer exhibiting more improved liquid permeability and strength while maintaining excellent absorption performance, and a method for preparing the super absorbent polymer.

Technical Solution

The present invention provides a super absorbent polymer comprising a base polymer powder including a first cross-linked polymer of a water-soluble ethylenically unsaturated monomer having at least partially neutralized acidic groups; and a surface cross-linked layer formed on the base polymer powder and including a second cross-linked polymer in which the first cross-linked polymer is further cross-linked via an alkylene carbonate having 2 to 5 carbon atoms, wherein the super absorbent polymer has the following features:

an absorbency represented by the following Formula 1 is 45 to 65 g/g, a saline flow conductivity for a physiological saline solution (0.685 wt % sodium chloride aqueous solution) (SFC; $^*10^{-7}$ cm$^3$·s/g) is 70 to 190 ($^*10^{-7}$ cm$^3$·s/g), and a gel strength (G') is 9,000 to 18,000 Pa.

$$\text{Absorbency} = \text{CRC} + \text{AUP} \qquad \text{[Formula 1]}$$

in Formula 1,

CRC represents a centrifuge retention capacity for a physiological saline solution (0.9 wt % sodium chloride aqueous solution) of the super absorbent polymer for 30 minutes, AUP represents an absorbency under pressure under 0.7 psi for a physiological saline solution (0.9 wt % sodium chloride aqueous solution) of the super absorbent polymer for 1 hour, and the gel strength (G') represents a horizontal gel strength of the super absorbent polymer measured using a rheometer, after absorbing and swelling a physiological saline solution (0.9 wt % sodium chloride aqueous solution) to the super absorbent polymer for 1 hour.

In addition, in the above-mentioned super absorbent polymer, the present invention provides a super absorbent polymer further comprising inorganic particles, for example, hydrophobic inorganic particles and hydrophilic inorganic particles, which are dispersed on the surface cross-linked layer.

The present invention provides a method for preparing a super absorbent polymer comprising the steps of:

carrying out a crosslinking polymerization of a water-soluble ethylenically unsaturated monomer having at least partially neutralized acidic groups in the presence of an internal crosslinking agent to form a hydrogel polymer including a first cross-linked polymer;

drying, pulverizing, and classifying the hydrogel polymer to form a base polymer powder having a gel strength (G') of 5,000 Pa or more;

adding hydrophobic inorganic particles having a water-contact angle of 50° or more on the base polymer powder; and heat-treating the base polymer powder to which the hydrophobic inorganic particles are added, in the presence of a surface crosslinking liquid containing hydrophilic inorganic particles having a water-contact angle of 10° or less, and a surface crosslinking agent of an alkylene carbonate having 2 to 5 carbon atoms, to perform a surface crosslinking.

Hereinafter, the super absorbent polymer according to specific embodiments of the invention, the preparation method thereof, and the like will be described in more detail. However, they are merely presented as an example of the present invention, and will be apparent to those skilled in the art that the scope of the present invention is not limited to these embodiments, and various modifications can be made to the embodiments within the scope of the present invention.

In addition, unless stated otherwise throughout this specification, the term "comprises" or "contains" means to include any constituent element (or constituent component) without particular limitation, and it cannot be interpreted as a meaning of excluding an addition of other constituent element (or constituent component).

According to one embodiment of the present invention, there is provided a super absorbent polymer comprising a base polymer powder including a first cross-linked polymer of a water-soluble ethylenically unsaturated monomer having at least partially neutralized acidic groups; and a surface cross-linked layer formed on the base polymer powder and including a second cross-linked polymer in which the first cross-linked polymer is further cross-linked via an alkylene carbonate having 2 to 5 carbon atoms, wherein the super absorbent polymer has the following features:

an absorbency represented by the following Formula 1 is 45 to 65 g/g, a saline flow conductivity for a physiological saline solution (0.685 wt % sodium chloride aqueous solution) (SFC; $^*10^{-7}$ cm$^3$·s/g) is 70 to 190 ($^*10^{-7}$ cm$^3$·s/g), and a gel strength (G') is 9,000 to 18,000 Pa.

$$\text{Absorbency} = \text{CRC} + \text{AUP} \qquad \text{[Formula 1]}$$

in Formula 1,

CRC represents a centrifuge retention capacity for a physiological saline solution (0.9 wt % sodium chloride aqueous solution) of the super absorbent polymer for 30 minutes, AUP represents an absorbency under pressure under 0.7 psi for a physiological saline solution (0.9 wt % sodium chloride aqueous solution) of the super absorbent polymer for 1 hour, and the gel strength (G') represents a horizontal gel strength of the super absorbent polymer measured using a rheometer, after absorbing and swelling a physiological saline solution (0.9 wt % sodium chloride aqueous solution) to the super absorbent polymer for 1 hour.

The super absorbent polymer of one embodiment may further comprise inorganic particles, for example, hydrophobic inorganic particles and hydrophilic inorganic particles, which are dispersed on the surface cross-linked layer.

The present inventors have conducted continuous research to further improve a liquid permeability of the super absorbent polymer. As a result, the inventors have found that, as the base polymer powder having high gel strength is obtained by optimizing the conditions of the production process of the super absorbent polymer, for example, type and content of an internal crosslinking agent and the polymerization conditions to be described later, and the surface crosslinking proceeds under specific surface crosslinking conditions (for example, specific two kinds of inorganic particles are sequentially used and the surface cross-linking temperature elevation condition can be set in a preferable range), it is possible to provide a super absorbent polymer which maintains excellent absorption performance while exhibiting greatly improved liquid permeability compared to those previously known.

Particularly, as specific silica particles defined by a predetermined contact angle range are pretreated on a base polymer powder, hydrophilic inorganic particles and a surface crosslinking liquid containing a specific surface crosslinking agent are added and then the surface crosslinking proceeds under specific temperature elevation conditions, it is considered that the surface cross-linked layer having a certain level or more of thickness can be evenly formed on the base polymer powder having high gel strength.

This is presumably because the inorganic particles, more specifically the hydrophobic and hydrophilic inorganic particles, are contained in the surface cross-linked layer structure (for example, within the cross-linked structure of the second cross-linked polymer in the surface cross-linked layer), thereby further tightening the cross-linked structure, and also the surface crosslinking reaction appropriately occurs around the respective inorganic particles under the above temperature elevation condition at the time of surface crosslinking, thereby effectively forming a second cross-linked polymer.

Thus, since the surface cross-linked layer can further increase the gel strength of each of the super absorbent polymer particles, the super absorbent polymer of one embodiment can exhibit very high gel strength of 9,000 to 18,000 Pa, and greatly improved liquid permeability defined by SFC of 70 to 190 ($\cdot 10^{-7}$ cm$^3$·s/g). Further, the super absorbent polymer of one embodiment can exhibit excellent absorption performance defined by the absorbency of 45 to 65 g/g, as the inner crosslinking structure and the surface crosslinking structure are optimized.

Therefore, the super absorbent polymer of one embodiment exhibits significantly improved liquid permeability and superior absorption performance than those previously known, and thus can be very preferably applied to various sanitary materials such as diapers with a content of pulp decreased.

Meanwhile, in the super absorbent polymer, the inorganic particles, more specifically hydrophobic inorganic particles having a water-contact angle of 50° or more, or 50° to 175°, and hydrophilic inorganic particles having a water-contact angle of 10° or less, or 1 to 10° can be used at the time of surface crosslinking. More specifically, the super absorbent polymer may further comprise hydrophobic inorganic particles dispersed on the base polymer powder and hydrophilic inorganic particles dispersed on the surface cross-linked layer. Such hydrophobic silica particles, for example, at least a part thereof, may be present on the surface of the base polymer powder (for example, in the surface cross-linked layer), and the remainder may be present in a state of being inserted into the surface of the base polymer powder or being embedded therein. In addition, the hydrophilic inorganic particles may be present in a state of being embedded in a cross-linked structure of the second cross-linked polymer of the surface cross-linked layer or in the surface of the surface cross-linked layer.

In this way, since the inorganic particles for improving the liquid permeability are present at least on the surface cross-linked layer, the improvement of the liquid permeability resulting therefrom can be maintained despite the passage of time, in particular, even when an external force is applied, high gel strength and improved liquid permeability can be maintained.

As the hydrophobic inorganic particles, at least one selected from the group consisting of silica particles, titania particles and zirconia particles having the contact angle range described above can be used. As the hydrophilic inorganic particles, at least one selected from the group consisting of silica particles, titania particles, zirconia particles, and laponite particles having a contact angle range of 10° or less can be used.

The water-contact angle, which distinguishes the hydrophilic and hydrophobic inorganic particles from each other, can be defined as a water-contact angle of the inorganic particles coated onto a glass substrate. Specific methods of measuring these contact angles are described in the following examples.

On the other hand, the super absorbent polymer may have a centrifuge retention capacity (CRC) of 24 to 35 g/g, or 25 to 32 g/g.

In this case, the centrifuge retention capacity (CRC) for the physiological saline solution can be calculated by the following Equation 1 after absorbing the super absorbent polymer in a physiological saline solution over a period of 30 minutes.

$$CRC(g/g) = \{[W_2(g) - W_1(g) - W_0(g)]/W_0(g)\} \quad \text{[Calculation Equation 1]}$$

in Calculation Equation 1, $W_0(g)$ is an initial weight(g) of the super absorbent polymer, $W_1(g)$ is a weight of the device not including the super absorbent polymer, measured after soaking the same in a physiological saline solution for 30 minutes and dehydrating the same by using a centrifuge at 250 G for 3 minutes, and $W_2(g)$ is the weight of the device including the super absorbent polymer, measured after soaking the super absorbent polymer in a physiological saline solution at room temperature for 30 minutes, and then dehydrating the same by using a centrifuge at 250 G for 3 minutes.

Meanwhile, the super absorbent polymer may have an absorbency under pressure (AUP) of 22 to 27 g/g, or 22 to 26 g/g.

The absorbency under pressure (AUP) can be calculated by the following Calculation equation 2 after absorbing the super absorbent polymer in a physiological saline solution under pressure of 0.7 psi over a period of 1 hour.

$$AUP(g/g) = [W_4(g) - W_3(g)]/W_0(g) \quad \text{[Calculation Equation 2]}$$

in Calculation Equation 2, $W_0(g)$ is an initial weight(g) of the super absorbent polymer, $W_3(g)$ is the total sum of a weight of the super absorbent polymer and a weight of the device capable of providing a load to the super absorbent polymer, and $W_4(g)$ is the total sum of a weight of the super absorbent polymer and a weight of the device capable of providing a load to the super absorbent polymer, after absorbing a physiological saline solution to the super absorbent polymer under a load (0.7 psi) for 1 hour.

As the super absorbent polymer of one embodiment exhibits the centrifuge retention capacity (CRC) and the absorbency under pressure (AUP) within the above-described range, the super absorbent polymer may have an absorbency defined by Formula 1 of 45 to 65 g/g, or 50 to 60 g/g. Thus, the super absorbent polymer of one embodiment can exhibit excellent absorption performance such as a basic absorption capacity and an absorbency under pressure and thus can be suitably used for various sanitary materials.

Meanwhile, the super absorbent polymer of one embodiment can exhibit the above-described absorption performance and the characteristic that the gel strength (G') is 9,000 to 18,000 Pa, or 9,500 to 15,000 Pa.

The horizontal gel strength G' can better reflect excellent liquid permeability under the environments of actually using water absorbent polymer. That is, conventionally the liquid permeability of the super absorbent polymer can be determined to be highly relevant depending on whether to exhibit excellent shape retaining property and high gel strength, irrespective of the force provided in the horizontal direction when the super absorbent polymer was contained in the sanitary materials such as diapers. The horizontal gel strength can better reflect the gel strength directly related to such liquid permeability. Therefore, it has been found that the super absorbent polymer in which the horizontal gel strength G' satisfies the above-mentioned range exhibits excellent liquid permeability, and thus can be used very preferably for sanitary materials such as diapers.

This horizontal gel strength G' can be measured by a method comprising the following respective steps by using a commercialized rheometer, after a physiological saline has been absorbed to the super absorbent polymer for 1 hour.

1) a step of absorbing a physiological saline solution to the super absorbent polymer to swell the super absorbent polymer;

2) a step of positioning the swelled super absorbent polymer between plates of a rheometer having a predetermined interval to pressurize the two plate surfaces;

3) a step of confirming a shear strain in the linear viscoelastic regime section where storage modulus and loss modulus are steady, while increasing the shear strain using the rheometer under vibration; and 4) a step of measuring the storage modulus and the loss modulus of the swelled super absorbent polymer under the confirmed shear strain, respectively, and measuring the average value of the storage modulus as a gel strength.

Further, the super absorbent polymer of one embodiment may have a saline flow conductivity for a physiological saline solution (SFC) of 70 to 190·$10^{-7}$ $cm^3$·s/g, or 70 to 150·$10^{-7}$ $cm^3$·s/g, or 80 to 130·$10^{-7}$ $cm^3$·s/g.

This saline flow conductivity for a physiological saline solution (SFC) can be measured and calculated according to the method already well-known to those skilled in the art, for example, the method disclosed in paragraphs [0184] to [0189] of Column 16 of U.S. Patent Application Publication No. 2009-0131255.

Meanwhile, the super absorbent polymer of one embodiment can be typically obtained by polymerizing a water-soluble ethylenically unsaturated monomer having at least partially neutralized acidic groups, such as a mixture of acrylic acid and its sodium salt in which at least a part of carboxylic acid is neutralized with sodium salt, in the presence of an internal crosslinking agent. More specifically, the super absorbent polymer can be obtained by carrying out a crosslinking polymerization of the above-mentioned monomer in the presence of an internal cross-linking agent to obtain a base polymer powder, and then surface-crosslinking the base polymer powder in the presence of a predetermined surface crosslinking agent and inorganic particles.

More specifically, it has been found that, as the base polymer powder having high gel strength is obtained by adjusting the type and content of an internal crosslinking agent, the polymerization conditions, and the like, for example, as the surface crosslinking proceeds under specific conditions such as using specific two types of inorganic particles sequentially and setting the temperature elevation condition for the surface crosslinking to a desirable range, it is possible to prepare a super absorbent polymer exhibiting the above-mentioned various physical properties.

According to another embodiment of the present invention, there is provided a method for preparing the super absorbent polymer of one embodiment. Such a preparation method may comprise the steps of:

carrying out a crosslinking polymerization of a water-soluble ethylenically unsaturated monomer having at least partially neutralized acidic groups in the presence of an internal crosslinking agent to form a hydrogel polymer including a first cross-linked polymer;

drying, pulverizing, and classifying the hydrogel polymer to form a base polymer powder having a gel strength (G') of 5,000 Pa or more;

adding hydrophobic inorganic particles having a water-contact angle of 50° or more on the base polymer powder; and heat-treating the base polymer powder to which the hydrophobic inorganic particles are added, in the presence of a surface crosslinking liquid containing hydrophilic inorganic particles having a water-contact angle of 10° or less, and a surface crosslinking agent of an alkylene carbonate having 2 to 5 carbon atoms, to perform a surface crosslinking.

According to this preparation method of another embodiment, at the time of surface crosslinking after the base polymer powder having a high gel strength is obtained, firstly, the above-mentioned hydrophobic inorganic particles are mixed with the base polymer powder in a solid state and subjected to its surface treatment, and then surface crosslinking is carried out using a surface crosslinking liquid containing the hydrophilic inorganic particles and the alkylene carbonate-based surface crosslinking agent. This makes it possible to uniformly form a surface cross-linked layer having a certain level or more of thickness, and to prepare a super absorbent polymer of one embodiment exhibiting excellent absorption performance together with improved gel strength and liquid permeability.

In such super absorbent polymer, the water-soluble ethylenically unsaturated monomer may include at least one selected from the group consisting of anionic monomers of acrylic acid, methacrylic acid, maleic anhydride, fumaric acid, crotonic acid, itaconic acid, 2-acryloylethanesulfonic acid, 2-methacryloylethanesulfonic acid, 2-(meth)acryloyl-propanesulfonic acid or 2-(meth)acrylamido-2-methylpropanesulfonic acid, and their salts; non-ionic, hydrophilic group-containing monomers of (meth)acrylamide, N-substituted (meth)acrylate, 2-hydroxyethyl(meth)acrylate, 2-hydroxypropyl(meth)acrylate, methoxypolyethylene glycol (meth)acrylate or polyethylene glycol (meth)acrylate; and amino group-containing unsaturated monomers of (N,N)-dimethylaminoethyl(meth)acrylate or (N,N)-dimethylaminopropyl(meth)acrylamide, and their quaternary product. Among them, acrylic acid and/or a salt thereof, for example, an alkali metal salt such as acrylic acid or and/or a sodium salt thereof having at least partially neutralized acrylic acids can be used, and the use of these monomers enables production of a super absorbent polymer having more excellent physical properties. In the case of using acrylic acid and its alkali metal salt as a monomer, it is possible to use acrylic acid after neutralizing at least a part thereof with a basic compound such as caustic soda (NaOH).

Further, as the internal crosslinking agent for crosslinking the monomer, at least one selected form the group consisting of bis(meth)acrylamide having 8 to 12 carbon atoms, poly(meth)acrylate of polyol having 2 to 10 carbon atoms and poly(meth)acrylate of polyol having 2 to 10 carbon atoms can be used. More specifically, as the internal crosslinking agent, one or more poly(meth)acrylates of polyols selected from the group consisting of polyethylene glycol di(meth)acrylate, polypropyleneoxy di(meth)acrylate, glycerin diacrylate, glycerin triacrylate and trimethylol triacrylate can be suitably used. Among them, as an internal crosslinking agent such as polyethylene glycol di(meth)acrylate is used, the internal crosslinking structure is optimized and a base polymer powder or the like having high gel strength can be obtained, Thereby, the super absorbent polymer satisfying excellent physical properties can be more appropriately obtained.

More specifically, as the specific internal crosslinking agent is used in a certain amount, it can be prepared so that the gel strength (G'; Pa) of the base polymer powder before surface crosslinking is 5,000 Pa or more, or 5,000 to 10,000 Pa, or 5,500 to 8,000 Pa. As the surface crosslinking step proceeds under certain conditions in this way, a super absorbent polymer of one embodiment can be obtained.

For example, the specific internal crosslinking agent may be used in a ratio of 0.0005 mol or more, or 0.0005 to 0.002 mol (or 0.4 or more parts by weight, or 0.4 to 1.5 parts by weight relative to 100 parts by weight of acrylic acid) based on 1 mol of the non-neutralized acrylic acid contained in the monomer. According to the content range of the internal crosslinking agent, a base polymer powder having a gel strength (G'; Pa) of 5,000 Pa or more before surface crosslinking can be appropriately obtained, and a super absorbent polymer of one embodiment can be obtained.

On the other hand, the gel strength of the base polymer powder can be measured according to the same method and conditions as the gel strength of the above-mentioned super absorbent polymer.

After carrying out a crosslinking polymerization of the monomer using the internal crosslinking agent, processes such as drying, pulverizing and classifying are performed to obtain a base polymer powder. Through the processes such as the pulverizing and classifying, the base polymer powder and the super absorbent polymer obtained therefrom are suitably prepared and provided so as to have a particle size of 150 to 850 µm or 150 to 710 µm. More preferably, at least 95% by weight of the base polymer powder and the super absorbent polymer obtained therefrom have a particle size of 150 to 710 µm, and fine powders having a particle size of less than 150 µm can be less than 3% by weight, or less than 1.5% by weight.

By adjusting the particle size distribution of the base polymer powder and the super absorbent polymer within the preferred range, the super absorbent polymer of one embodiment can more appropriately exhibit the physical properties already mentioned above.

In addition, the super absorbent polymer of one embodiment may comprise a base polymer powder including a first cross-linked polymer prepared by the above-mentioned method, and a surface cross-linked layer including a second cross-linked polymer in which the first cross-linked polymer is further cross-linked by surface crosslinking.

The surface crosslinking for forming the surface cross-linked layer may be performed by adding the hydrophobic inorganic particles, subjecting to dry treatment on the base polymer powder, and then heat-treating the base polymer powder to which the hydrophobic inorganic particles are added, in the presence of a surface crosslinking liquid containing the hydrophilic inorganic particles, and a surface crosslinking agent of an alkylene carbonate having 2 to 5 carbon atoms. The hydrophobic and hydrophilic inorganic particles have been described above, and thus more specific description thereon will be omitted.

Further, more suitable examples of the alkylene carbonate having 2 to 5 carbon atoms which can be used as the surface crosslinking agent include ethylene carbonate, propylene carbonate, or butylene carbonate, and two or more selected among them may be used together.

On the other hand, hereinafter, the method capable of preparing the super absorbent polymer of one embodiment described above will be described in more detail according to respective steps. However, with regard to the monomers, internal crosslinking agent, surface crosslinking agent, inorganic particles and particle size distribution already described above, duplicating explanation thereon will be omitted, and the remaining process configuration and condition will be described in detail for each step of the process.

The method for preparing the super absorbent polymer may comprise the steps of: forming a hydrogel polymer including a first cross-linked polymer by carrying out a thermal polymerization or photo polymerization of a monomer composition including a water-soluble ethylenically unsaturated monomer, an internal crosslinking agent and a polymerization initiator; drying the hydrogel polymer; pulverizing and classifying the dried polymer to form a base polymer powder; and treating the hydrophobic inorganic particles on the base polymer powder and performing a surface crosslinking of the base polymer powder using the surface crosslinking liquid containing the hydrophilic silica particles and the surface crosslinking agent.

In the above preparation method, the monomer composition includes a water-soluble ethylenically unsaturated monomer, an internal crosslinking agent and a polymerization initiator, and the types of the monomers are the same as those already described above.

Further, in the above composition, the concentration of the water-soluble ethylenically unsaturated monomer may be 20 to 60% by weight, or 40 to 50% by weight based on the entire monomer composition including the respective raw materials and solvents described above, and it may be controlled to be an adequate concentration in consideration of the polymerization time, the reaction conditions or the like. However, when the concentration of the monomer is too low, the yield of the super absorbent polymer is low and there may be a problem with economics. By contrast, when the concentration is too high, there may be problems on the process that some of the monomers may be deposited or the pulverizing efficiency of the prepared hydrogel polymer appears to be low in the pulverizing process, and thus the physical properties of the super absorbent polymer may decrease.

Further, the polymerization initiator is not particularly limited as long as it is what is generally used in the preparation of the super absorbent polymer.

Specifically, the polymerization initiator may include a thermal polymerization initiator or a photo polymerization initiator by UV irradiation, according to the polymerization method. However, even in the case of photo polymerization method, a thermal polymerization initiator may be additionally included because a certain amount of heat is generated by the irradiation of UV ray and the like, and a certain amount of heat is generated in accordance with the progress of the polymerization reaction, which is an exothermic reaction, and thus, a thermal polymerization initiator may be further included.

The photo polymerization initiator that can be used is not particularly limited by its constitution as long as it is a compound capable of forming a radical by light such as ultraviolet rays.

The photo-polymerization initiator used herein may include, for example, at least one selected from the group consisting of benzoin ether, dialkyl acetophenone, hydroxyl alkylketone, phenyl glyoxylate, benzyl dimethyl ketal, acyl phosphine and α-aminoketone. Meanwhile, specific examples of the acyl phosphine, commercialized lucirin TPO, namely, 2,4,6-trimethyl-benzoyl-trimethyl phosphine oxide may be used. More various photo polymerization initiators are well disclosed in "UV Coatings: Basics, Recent Developments and New Application" written by Reinhold Schwalm, (Elsevier, 2007), p 115, however the example of the photo polymerization initiator is not limited thereto.

The photo polymerization initiator may be included in a concentration of 0.0005% to 0.05% by weight based on the monomer composition. When the concentration of the photo polymerization initiator is too low, the polymerization rate may become slow, and when the concentration of the photo polymerization initiator is too high, the molecular weight of the super absorbent polymer becomes small and the physical properties may become uneven.

And, as the thermal polymerization initiator, one or more selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate (($NH_4)_2S_2O_8$), and the like; and examples of the azo-based initiator include 2,2-azobis(2-amidinopropane) dihydrochloride, 2,2-azobis-(N,N-dimethylene)isobutyramidine dihydrochloride, 2-(carbamoylazo)isobutylonitril, 2,2-azobis[2-(2-imidazolin-2-yl)propane]dihydrochloride, 4,4-azobis-(4-cyanovaleric acid) or the like. More various thermal polymerization initiators are well disclosed in "Principle of Polymerization" written by Odian, (Wiley, 1981), p 203, however the example of the thermal polymerization initiator is not limited thereto.

The thermal polymerization initiator may be included in a concentration of 0.001 to 0.5% by weight with respect to the monomer composition. If the concentration of such a thermal polymerization initiator is too low, additional thermal polymerization hardly occurs and the effect due to the addition of the thermal polymerization initiator may be insignificant. If the concentration of the thermal polymerization initiator is excessively high, the molecular weight of the super absorbent polymer may be small and the physical properties may become uneven.

In addition, the types of the internal crosslinking agent contained together with the monomer composition are the same as those already described above. The above internal crosslinking agent may be used in a ratio of 0.0005 mol or more, or 0.0005 to 0.002 mol (or 0.4 or more parts by weight, or 0.4 to 1.5 parts by weight relative to 100 parts by weight of acrylic acid) based on 1 mol of the non-neutralized acrylic acid contained in the monomer. As the internal crosslinking agent is used within such content range, a gel strength range before the surface crosslinking can be suitably satisfied. By using the above, the super absorbent polymer more suitably satisfying the physical properties according to one embodiment can be obtained.

In addition, the monomer composition may further include additives such as a thickener, a plasticizer, a preservation stabilizer, an antioxidant, and so on, as needed.

The monomer composition may be prepared in the form of solution wherein the raw materials such as the water-soluble ethylenically unsaturated monomer, the photo polymerization initiator, the thermal polymerization initiator, the internal crosslinking agent, and the additives are dissolved in a solvent.

At this time, the above-described solvents can be used without limitation in the constitution as long as they are those which can dissolve said components. For example, one or more solvents selected from the group consisting of water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butylolactone, carbitol, methylcellosolve acetate, and N,N-dimethyl acetamide, and so on may be used alone or in combination.

The solvent may be included in the residual quantity excluding the components disclosed above based on the total content of the monomer composition.

Meanwhile, the method of forming a hydrogel polymer by subjecting such monomer composition to the thermal polymerization or photo polymerization can be used without limitation in the constitution as long as it is a method generally used in the polymerization.

Specifically, the polymerization method is largely classified into the thermal polymerization and the photo polymerization according to the polymerization energy source. Usually, the thermal polymerization may be carried out in the reactor like kneader equipped with agitating spindles, and the photo polymerization may be carried out in the reactor equipped with movable conveyor belt, however the polymerization method disclosed above is only one example, and the present invention is not limited to the polymerization methods disclosed above.

As an example, the hydrogel polymer obtained by subjecting to the thermal polymerization in the reactor like kneader equipped with the agitating spindles disclosed above by providing hot air thereto or heating the reactor may have the size of centimeters or millimeters when it is discharged from the outlet of the reactor, according to the types of the agitating spindles equipped in the reactor. Specifically, the size of the obtained hydrogel polymer can be variously shown according to the concentration of the monomer composition fed thereto, the feeding speed, and the like, and the hydrogel polymer of which the weight average particle size is 2 to 50 mm can be generally obtained.

Further, as described above, when the photo polymerization is carried out in a reactor equipped with a movable conveyor belt, the hydrogel polymer typically obtained may be a hydrogel polymer in a sheet-type having a width of the belt. In this case, the thickness of the polymer sheet may vary according to the concentration of the monomer composition fed thereto and the feeding speed, and the polymer sheet is preferably controlled to have a thickness of 0.5 to 5 cm. If the monomer composition is fed so that the thickness of the sheet-type polymer becomes too thin, the production efficiency becomes low, which is not preferred. If the thickness of the sheet-type polymer exceeds 5 cm, the polymerization reaction may not uniformly occur throughout the thickness of the polymer due to the excessively high thickness.

In this case, the hydrogel polymer thus obtained by the above-described method may have typically a water content of 40 to 80% by weight. Meanwhile, the term "water content" as used herein means a weight occupied by moisture with respect to a total amount of the hydrogel polymer, which may be the value obtained by subtracting the weight of the dried polymer from the weight of the hydrogel polymer. Specifically, the water content is defined as a value calculated by measuring the weight loss according to evaporation of water in the polymer during the drying process of increasing the temperature of the polymer with infrared heating. At this time, the water content is measured under the drying conditions which are determined as follows; the temperature is increased from room temperature to 180° C., then the temperature is maintained at 180° C., and the total drying time is set to 20 minutes, including 5 minutes for the temperature rising step.

Next, the step of drying the hydrogel polymer thus obtained is performed.

If necessary, a coarsely pulverizing step may be performed before the drying step, in order to increase the efficiency of the drying step.

In this case, a pulverizing device used herein may include, but the constitution is not limited to, any one selected from the group consisting of a vertical pulverizing device, a turbo cutter, a turbo grinder, a rotary cutter mill, a cutter mill, a disc mill, a shred crusher, a crusher, a chopper, and a disc cutter, but is not limited thereto.

In this case, the coarsely pulverizing step may be performed so that the hydrogel polymer has a particle size of 2 to 10 mm.

To pulverize the polymer to have a particle size of less than 2 mm is technically not easy due to a high water content of the hydrogel polymer, and a phenomenon of agglomeration may occur between the pulverized particles. Meanwhile, if the polymer is pulverized to have a particle size of larger than 10 mm, the effect of increasing the efficiency in the subsequent drying step may be insignificant.

The hydrogel polymer coarsely pulverized as above or immediately after polymerization without the coarsely pulverizing step is subjected to a drying step. At this time, the drying temperature of the drying step may be 150 to 250° C. When the drying temperature is less than 150° C., there is a concern that the drying time becomes excessively long or the physical properties of the super absorbent polymer finally formed may be deteriorated, and when the drying temperature is higher than 250° C., only the surface of the polymer is excessively dried, and thus there is a concern that fine powder may be generated during the subsequent pulverization process and the physical properties of the super absorbent polymer finally formed may be deteriorated. Therefore, the drying process may be preferably performed at a temperature of 150 to 200° C., and more preferably 170 to 195° C.

Meanwhile, the drying step may be carried out for 20 to 90 minutes, in consideration of the process efficiency, but is not limited thereto.

Furthermore, any known drying method may be selected and used in the drying step without limitation in the constitution if it can be generally used for drying the hydrogel polymer. Specifically, the drying step may be carried out by a method of supplying hot air, irradiating infrared rays, irradiating microwaves, irradiating ultraviolet rays or the like. When the drying step as above is finished, the water content of the polymer may be about 0.1 to about 10% by weight.

Next, the dried polymer obtained from the drying step is subjected to a pulverization step.

The polymer powder obtained from the pulverization step may have a particle size of 150 to 850 μm. Specific examples of a milling device that can be used to achieve the above particle size may include a pin mill, a hammer mill, a screw mill, a roll mill, a disc mill, a jog mill or the like, but the present invention is not limited thereto.

In order to properly control the physical properties of the super absorbent polymer powder finally produced after the pulverization step, a separate classifying step can be performed according to the particle sizes of the polymer powders obtained from the pulverization. Preferably, a polymer having a particle size of 150 to 850 μm is classified and only particle having such particle size is subjected to the surface crosslinking reaction and finally it can be commercialized. The particle size distribution of the base polymer powder obtained through such process has been described above, and thus more specific description thereon will be omitted.

The horizontal gel strength (G') of the above-mentioned base polymer powder before surface crosslinking can satisfy the range of 5000 Pa or more, or 5,000 to 10,000 Pa, or 5,500 to 8,500 Pa. When the horizontal gel strength (G') of the base polymer powder before surface crosslinking falls within the above range, the super absorbent polymer produced through the surface crosslinking reaction described later can achieve the physical properties of one embodiment.

On the other hand, after obtaining the base polymer powder through the pulverizing and classifying steps, the super absorbent polymer can be prepared through the surface crosslinking step. The types of the surface crosslinking agent, the hydrophobic and/or hydrophilic inorganic particles usable in the surface crosslinking step have been described above, and thus more specific description thereon will be omitted.

First, the base polymer powder may be mixed with the hydrophobic inorganic particles in a solid state and treated on the surface thereof. The treatment method thereof may be based on a dry process and/or a mixing method of a general inorganic powder.

With regard to the method of adding the surface crosslinking liquid containing the hydrophilic inorganic particles and the surface crosslinking agent to the base polymer powder, there is no particular limitation in the constitution. For example, a method of adding and mixing the surface crosslinking liquid and the base polymer powder in a reactor, a method of spraying the surface crosslinking liquid onto the base polymer powder, or a method of continuously feeding the base polymer powder and the surface crosslinking liquid to a mixer which is continuously operated, or the like, may be used.

Further, the hydrophobic inorganic particles and the hydrophilic inorganic particles may be used in an amount of 0.0001 to 0.3 parts by weight, or 0.001 to 0.1 parts by weight, based on 100 parts by weight of the base polymer powder, respectively. Thus, the liquid permeability and various properties of the super absorbent polymer can be improved more effectively according to the use of the respective silica particles.

The super absorbent polymer of one embodiment prepared using the respective inorganic particles in the range of such content can also contain hydrophobic and hydrophilic inorganic particles within a range equivalent thereto.

In addition, the surface crosslinking liquid may further include water and/or a hydrophilic organic solvent as a medium. Thus, there is an advantage that the surface crosslinking agent and the hydrophilic inorganic particles can be evenly dispersed on the base polymer powder. In this case, the content of water and the hydrophilic inorganic solvent can be applied by adjusting the addition ratio with respect to 100 parts by weight of the base polymer powder, for the purpose of inducing the uniform dispersion of the surface crosslinking agent and the hydrophilic inorganic particles, preventing the phenomenon of aggregation of the base polymer powder and at the same time optimizing the surface penetration depth of the surface crosslinking agent.

The surface crosslinking reaction can be proceeded by heating the surface crosslinking liquid-added base polymer powder at a maximum reaction temperature of 140° C. to 200° C., or 170° C. to 195° C. for 5 minutes to 60 minutes, or 10 minutes to 50 minutes, or 20 minutes to 45 minutes. More specifically, the surface crosslinking step can be proceeded by subjecting to a heat treatment under the conditions in which the temperature is raised from an initial temperature of 20° C. to 130° C., or 40° C. to 120° C. to the maximum reaction temperature over a period of 10 minutes to 30 minutes, and the maximum temperature is maintained for 5 minutes to 60 minutes.

It was found that, by satisfying the conditions of such a surface crosslinking step (in particular, the temperature elevation conditions and the reaction conditions at the maximum temperature of the reaction), the super absorbent polymer suitably satisfying the physical properties of one embodiment can be prepared.

A means for raising the temperature for surface crosslinking reaction is not particularly limited. Heating may be performed by providing a heating medium or by directly providing a heat source. In this case, the type of the heating medium applicable herein may be a hot fluid such as steam, hot air, hot oil, or the like, but the present invention is not limited thereto. Further, the temperature of the heating medium provided may be properly controlled, considering the means of the heating medium, the temperature-raising rate, and the temperature-raising target temperature. Meanwhile, as the heat source provided directly, an electric heater or a gas heater may be used, but the present invention is not limited to these examples.

The super absorbent polymer obtained according to the above-mentioned preparation method maintains excellent absorption performance such as water retention capacity and absorbency under pressure and can satisfy more improved horizontal gel strength, liquid permeability and the like, thereby satisfying all physical properties of one embodiment. Accordingly, it can be suitably used for sanitary materials such as diapers, particularly, ultra-thin sanitary materials having reduced pulp content.

Advantageous Effects

According to the present invention, the super absorbent polymer maintaining excellent absorption performance such as a centrifuge retention capacity and an absorbency under pressure and satisfying more improved horizontal gel strength, liquid permeability, and the like can be prepared and provided.

This super absorbent polymer can be suitably used for sanitary materials such as disposable diapers, particularly ultra-thin sanitary materials with reduced content of pulp.

DETAILED DESCRIPTION OF THE EMBODIMENTS

Hereinafter, the preferred Examples are provided for better understanding of the invention. However, these Examples are given for illustrative purposes only and not intended to limit the scope of the present invention.

In the Examples and Comparative Examples below, the water-contact angles of hydrophobic inorganic particles and hydrophilic inorganic particles were measured as follows.

First, a coating solution in which the hydrophobic inorganic particles were dispersed in a methylene chloride solvent in a concentration of 5% by weight was used. The coating solution was spin-coated on a wafer having no surface roughness and dried at room temperature to remove remaining solvent. Water was dropped onto the coating layer, and the contact angle was measured. The contact angle thus measured is defined as a water-contact angle of the hydrophobic inorganic particles, and the measured values are shown in Table 1 below.

Further, in the case of hydrophilic inorganic particles, the water-contact angle was measured in the same manner as in the case of the hydrophobic inorganic particles, except that a coating liquid dispersed in water at a concentration of 20% by weight was used.

TABLE 1

| Inorganic particles | Product name | Water-contact angle(°) |
|---|---|---|
| Hydrophobic inorganic particles | DM30S | 145 |
| | Aerogel | 148 |
| | R972 | 117 |
| Hydrophilic inorganic particles | ST-O | 3 |
| | ST-AK | 3 |

In the following Examples and Comparative Examples, the physical properties of each super absorbent polymer were measured and evaluated by the following methods.

(1) Evaluation of Particle Size

The particle sizes of the base polymer powders and the super absorbent polymers used in Examples and Comparative Examples were measured in accordance with EDANA (European Disposables and Nonwovens Association) recommended test method No. WSP 220.3.

(2) CRC (Centrifuge Retention Capacity)

For the absorbent polymers prepared in Examples and Comparative Examples, the centrifuge retention capacity (CRC) by absorption magnification under a non-loading condition was measured in accordance with EDANA (European Disposables and Nonwovens Association) recommended test method No. WSP 241.3.

That is, after uniformly inserting $W_0(g)$ (about 0.2 g) of each polymer obtained in Examples and Comparative Examples in a nonwoven fabric-made bag and sealing the same, it was soaked in a physiological saline solution composed of 0.9 wt % sodium chloride aqueous solution at room temperature. After 30 minutes, water was removed from the bag by centrifugation at 250 G for 3 minutes, and the weight $W_2(g)$ of the bag was then measured. Further, the same procedure was carried out without using the polymer, and then the resultant weight $W_1(g)$ was measured.

Using the respective weights thus obtained, the CRC(g/g) was determined according to the following Calculation Equation 1.

$$CRC(g/g) = \{[W_2(g) - W_1(g) - W_0(g)]/W_0(g)\} \quad \text{[Calculation Equation 1]}$$

in Calculation Equation 1, $W_0(g)$ is an initial weight(g) of the super absorbent polymer, $W_1(g)$ is a weight of the device not including the super absorbent polymer, measured after soaking the same in a physiological saline solution for 30 minutes and dehydrating the same by using a centrifuge at 250 G for 3 minutes, and $W_2(g)$ is a weight of the device including the super absorbent polymer, measured after soaking the super absorbent polymer in a physiological saline solution at room temperature for 30 minutes, and then dehydrating the same by using a centrifuge at 250 G for 3 minutes.

(3) Absorbency Under Pressure (AUP)

For the absorbent polymers prepared in Examples and Comparative Examples, the absorbency under pressure was measured in accordance with EDANA (European Disposables and Nonwovens Association) recommended test method No. WSP 242.3.

First, a 400 mesh stainless steel net was installed in the cylindrical bottom of a plastic having an internal diameter of 60 mm. $W_0(g, 0.90 g)$ of the absorbent polymers prepared in Examples 1-6 and Comparative Examples 1-3 were uniformly scattered on the steel net under conditions of temperature of 23±2° C. and relative humidity of 45%, and a piston which can provide a load of 4.83 kPa (0.7 psi) uniformly was put thereon. The external diameter of the piston was slightly smaller than 60 mm, there was no gap between the cylindrical internal wall and the piston, and the jig-jog of the cylinder was not interrupted. At this time, the weight $W_3(g)$ of the device was measured.

After putting a glass filter having a diameter of 125 mm and a thickness of 5 mm in a Petri dish having a diameter of 150 mm, a physiological saline solution composed of 0.90 wt % of sodium chloride was poured in the dish until the surface level became equal to the upper surface of the glass filter. A sheet of filter paper having a diameter of 120 mm was put thereon. The measuring device was put on the filter paper and the solution was absorbed under a load for 1 hour. After 1 hour, the weight $W_4(g)$ was measured after lifting the measuring device up.

Using the respective weights thus obtained, AUP(g/g) was calculated according to the following Calculation Equation 2, thereby confirming the absorbency under pressure.

$$AUP(g/g)=[W_4(g)-W_3(g)]/W_0(g) \quad \text{[Calculation Equation 2]}$$

in Calculation Equation 2, $W_0(g)$ is an initial weight(g) of the super absorbent polymer, $W_3(g)$ is the total sum of a weight of the super absorbent polymer and a weight of the device capable of providing a load to the super absorbent polymer, and $W_4(g)$ is the total sum of a weight of the super absorbent polymer and a weight of the device capable of providing a load to the super absorbent polymer, after absorbing a physiological saline solution to the super absorbent polymer under a load (0.7 psi) for 1 hour.

(4) Gel Strength (G')

For the absorbent polymers/based polymer powders prepared in Examples and Comparative Examples, the horizontal gel strength was measured.

First, the absorbent polymer samples (30~50 mesh) prepared in Examples and Comparative Examples were sieved off and 0.5 g of the samples were weighed. The weighed samples were sufficiently swelled in 50 g of a physiological saline solution for 1 hour. After that, the solvent not absorbed therein was removed by using an aspirator for 4 minutes, and the solvent left on the surface of the same was evenly distributed and wiped once with a filter paper.

2.5 g of the swelled super absorbent polymer was loaded between two parallel plates (parallel plates with a 25 mm diameter, a lower plate thereof having a wall with a 2 mm height for preventing the sample from leaking) of the rheometer, and the gap (1 mm) between the parallel plates was adjusted. At this time, the gap between the parallel plates was properly adjusted by pressing the plates with a force of about 3 N so that the swelled sample was contacted evenly at the face of the plates.

A linear viscoelastic regime section of strain where the storage modulus and the loss modulus were steady was found by using the rheometer while increasing the shear strain at a 10 rad/s oscillation frequency. Generally, in the case of a swelled super absorbent polymer, a strain of 0.1% is imparted in the liner viscoelastic regime section.

The storage modulus and the loss modulus of the swelled super absorbent polymer was measured by using the strain value of the linear viscoelastic regime section at an oscillation frequency of 10 rad/s for 60 seconds. The horizontal gel strength was obtained by taking an average of the obtained storage modulus. For reference, the loss modulus was measured as a very small value as compared to the storage modulus.

(5) Saline Flow Conductivity (SFC)

The saline flow conductivity was measured in accordance with the method disclosed in paragraphs [0184] to [0189] of Column 16 of U.S. patent application publication no. 2009-0131255.

Example 1

500 g of acrylic acid and 3 g of polyethylene glycol diacrylate (Mw=523) were added and mixed. Then, 0.01 g of diphenyl(2,4,6-trimethylbenzoyl)-phosphine oxide was added and dissolved. Then, 896.4 g of 24.5 wt % sodium hydroxide aqueous solution was added, and nitrogen was continuously added to prepare a water-soluble unsaturated monomer aqueous solution. Then, the temperature of the aqueous solution was cooled to 50° C., and the aqueous solution was irradiated with ultraviolet rays for 90 seconds to obtain a hydrogel-like polymer. The obtained hydrogel polymer was pulverized using a pulverizing device. Classification was carried out with a standard mesh sieve according to ASTM Standard to prepare a base polymer powder having a particle size of 150 μm to 710 μm. The gel strength of this base polymer powder was measured to be 6,588 Pa.

Then, 0.05 parts by weight of hydrophobic silica particles (DM30S) were added to 100 parts by weight of the prepared base polymer powder and the base polymer powder and the hydrophobic silica particles were mixed well with stirring at room temperature, and then subjected to a dry treatment. Subsequently, 1 g of ethylene carbonate, and 0.2 g of an aqueous solution in which hydrophilic silica particles (ST-0) were dispersed in water in a concentration of 20% by weight were added to 3 g of water and mixed to prepare a surface crosslinking liquid. Thereafter, the surface crosslinking liquid was sprayed onto the base polymer powder, stirred at room temperature and mixed so that the surface crosslinking liquid was evenly distributed on the base polymer powder. Then, the base polymer powder mixed with the surface crosslinking liquid was put into the surface crosslinking reactor and the surface cross-linking reaction was carried out.

In the surface crosslinking reactor, it was confirmed that the base polymer powder was gradually heated at an initial temperature near 180° C. After 30 minutes elapsed, operation was performed so as to reach the maximum reaction temperature of 190° C. After reaching the maximum reaction temperature, additional reaction was carried out for 15 minutes, and a sample of the finally produced super absorbent polymer was taken. After the surface crosslinking step, classification was carried out with a standard mesh sieve according to ASTM Standard to prepare a super absorbent polymer of Example 1 having a particle size of 150 μm to 710 μm.

Example 2

A super absorbent polymer of Example 2 was prepared according to the same method and surface crosslinking condition as in Example 1, except that, for the base polymer powder (gel strength: 6,588 Pa), 0.05 part by weight of Aerogel was added instead of the hydrophobic silica particle DM30S.

After the above surface crosslinking step, classification was carried out with a standard mesh sieve according to ASTM Standard to obtain a polymer powder of Example 2 having a particle size of 150 to 710 μm.

Example 3

A super absorbent polymer of Example 3 was prepared according to the same method and surface crosslinking condition as in Example 1, except that, for the base polymer powder (gel strength: 6,588 Pa), 0.05 part by weight of R972 was added instead of the hydrophobic silica particle DM30S.

After the above surface crosslinking step, classification was carried out with a standard mesh sieve according to ASTM Standard to obtain a polymer powder of Example 3 having a particle size of 150 to 710 μm.

Example 4

A super absorbent polymer of Example 4 was prepared according to the same method and surface crosslinking condition as in Example 1, except that, for the base polymer powder (gel strength: 6,588 Pa), the hydrophobic silica particles(DM30S) were added in an amount of 0.02 part by weight.

After the above surface crosslinking step, classification was carried out with a standard mesh sieve according to ASTM Standard to obtain a polymer powder of Example 4 having a particle size of 150 to 710 μm.

Example 5

A super absorbent polymer of Example 5 was prepared according to the same method and surface crosslinking condition as in Example 1, except that, for the base polymer powder (gel strength: 6,588 Pa), the hydrophobic silica particle DM30S was added in an amount of 0.1 part by weight.

After the above surface crosslinking step, classification was carried out with a standard mesh sieve according to ASTM Standard to obtain a polymer powder of Example 5 having a particle size of 150 to 710 μm.

Example 6

A super absorbent polymer of Example 6 was prepared according to the same method and surface crosslinking condition as in Example 1, except that the amount of the hydrophilic silica particle aqueous solution (ST-O) was changed to 0.4 g at the time of surface crosslinking of the base polymer powder (gel strength: 6,588 Pa).

After the above surface crosslinking step, classification was carried out with a standard mesh sieve according to ASTM Standard to obtain a polymer powder of Example 6 having a particle size of 150 to 710 μm.

Example 7

A super absorbent polymer of Example 7 was prepared according to the same method and surface crosslinking condition as in Example 1, except that 0.4 g of an aqueous solution in which hydrophilic silica particles (ST-AK) were dispersed in water at a concentration of 20% by weight was used instead of ST-O at the time of surface cross-linking of the base polymer powder (gel strength: 6,588 Pa).

After the above surface crosslinking step, classification was carried out with a standard mesh sieve according to ASTM Standard to obtain a polymer powder of Example 7 having a particle size of 150 to 710 μm.

Comparative Example 1

A super absorbent polymer of Comparative Example 1 was prepared according to the same method as in Example 1, except that the hydrophobic silica particles and the hydrophilic silica particle aqueous solution were not used at the time of surface crosslinking of the base polymer powder (gel strength: 6,588 Pa).

After the above surface crosslinking step, classification was carried out with a standard mesh sieve according to ASTM Standard to obtain a polymer powder of Comparative Example 1 having a particle size of 150 to 710 μm.

Comparative Example 2

A super absorbent polymer of Comparative Example 2 was prepared according to the same method as in Example 1, except that the hydrophobic silica particles was not used for the base polymer powder (gel strength: 6,588 Pa), and the amount of the hydrophilic silica particle aqueous solution (ST-0) was changed to 0.4 g at the time of surface crosslinking.

After the above surface crosslinking step, classification was carried out with a standard mesh sieve according to ASTM Standard to obtain a polymer powder of Comparative Example 2 having a particle size of 150 to 710 μm.

Comparative Example 3

A super absorbent polymer of Comparative Example 3 was prepared according to the same method as in Example 1, except that, for the base polymer powder (gel strength: 6,588 Pa), the amount of the hydrophobic silica particles (DM30S) was changed to 0.05 parts by weight and the aqueous solution of hydrophilic silica particles was not used at the time of surface crosslinking.

After the above surface crosslinking step, classification was carried out with a standard mesh sieve according to ASTM Standard to obtain a polymer powder of Comparative Example 3 having a particle size of 150 to 710 μm.

Comparative Example 4

A super absorbent polymer of Comparative Example 4 was prepared according to the same method as in Example 1, except that the amount of polyethylene glycol diacrylate (Mw=523) was changed to 1 g to prepare a base polymer powder. The gel strength of this base polymer powder was measured to be 4,870 Pa.

After the above surface crosslinking step, classification was carried out with a standard mesh sieve according to ASTM Standard to obtain a polymer powder of Comparative Example 4 having a particle size of 150 to 710 μm.

Comparative Example 5

A super absorbent polymer of Comparative Example 5 was prepared according to the same method as in Example 2, except that the amount of polyethylene glycol diacrylate (Mw=523) was changed to 1 g to prepare a base polymer powder. The gel strength of this base polymer powder was measured to be 4,870 Pa.

After the above surface crosslinking step, classification was carried out with a standard mesh sieve according to ASTM Standard to obtain a polymer powder of Comparative Example 5 having a particle size of 150 to 710 μm.

Comparative Example 6

A super absorbent polymer of Comparative Example 6 was prepared according to the same method as in Example 3, except that the amount of polyethylene glycol diacrylate (Mw=523) was changed to 1 g to prepare a base polymer powder. The gel strength of this base polymer powder was measured to be 4,870 Pa.

After the above surface crosslinking step, classification was carried out with a standard mesh sieve according to ASTM Standard to obtain a polymer powder of Comparative Example 6 having a particle size of 150 to 710 μm.

For the super absorbent polymers of Examples 1 to 7 and Comparative Examples 1 to 6, the physical property measurement and evaluation of CRC, AUP, SFC and gel strength (G') were carried out, and the measured physical property values are shown in Table 2 below. In addition, from the measured CRC and AUP, the absorbency of Formula 1 were calculated and shown in Table 2 below.

TABLE 2

|  | CRC (g/g) | AUP (g/g) | Absorbency (g/g) | Gel strength(Pa) | SFC ($10^{-7}$ cm$^3$s/g) |
|---|---|---|---|---|---|
| Example 1 | 27.8 | 24.4 | 52.2 | 11354 | 105 |
| Example 2 | 27.9 | 23.9 | 51.8 | 11792 | 120 |
| Example 3 | 27.8 | 24.6 | 52.4 | 10998 | 95 |
| Example 4 | 28.1 | 24.7 | 52.8 | 11678 | 111 |
| Example 5 | 27.8 | 23.9 | 51.7 | 10329 | 107 |
| Example 6 | 28.0 | 24.0 | 52.0 | 10329 | 108 |
| Example 7 | 27.5 | 24.7 | 52.2 | 11204 | 110 |
| Comparative Example 1 | 27.7 | 25.2 | 52.9 | 9998 | 52 |
| Comparative Example 2 | 27.5 | 24.9 | 52.4 | 10080 | 56 |
| Comparative Example 3 | 27.8 | 24.4 | 52.2 | 10245 | 63 |
| Comparative Example 4 | 28.5 | 23.6 | 52.1 | 6924 | 42 |
| Comparative Example 5 | 28.8 | 23.4 | 52.2 | 6854 | 45 |
| Comparative Example 6 | 28.6 | 23.8 | 52.4 | 7052 | 32 |

Referring to Table 2, it was confirmed that the super absorbent polymers of Examples exhibited more improved gel strength and liquid permeability such as SFC, while exhibiting absorption characteristics in a level equal to or higher than those of Comparative Examples,

The invention claimed is:

1. A super absorbent polymer comprising
a base polymer powder including a first cross-linked polymer of a water-soluble ethylenically unsaturated monomer having at least partially neutralized acidic groups;
a surface cross-linked layer formed on the base polymer powder and including a second cross-linked polymer in which the first cross-linked polymer is further cross-linked through an alkylene carbonate having 2 to 5 carbon atoms,
hydrophobic inorganic particles that are dispersed on the base polymer powder and have a water-contact angle of 50° or more on the base polymer powder,
hydrophilic inorganic particles that are dispersed on the surface cross-linked layer and have a water-contact angle of 10° or less, and
wherein the hydrophobic inorganic particles include at least one selected from the group consisting of silica particles, titania particles and zirconia particles, and the hydrophilic inorganic particles includes at least one selected from the group consisting of silica particles, titania particles, zirconia particles, and laponite particles wherein the super absorbent polymer has the following features:
an absorbency represented by the following Formula 1 is 45 to 65 g/g,
a saline flow conductivity for a physiological saline solution (0.685 wt % sodium chloride aqueous solution) (SFC; $^*10^{-7}$ cm$^3\cdot$s/g) is 70 to 190 ($^*10^{-7}$ cm$^3\cdot$s/g), and
a gel strength (G') is 9,000 to 18,000 Pa.

Absorbency=CRC+AUP    [Formula 1]

in Formula 1,
CRC represents a centrifuge retention capacity for a physiological saline solution (0.9 wt % sodium chloride aqueous solution) of the super absorbent polymer for 30 minutes,
AUP represents an absorbency under pressure under 0.7 psi for a physiological saline solution (0.9 wt % sodium chloride aqueous solution) of the super absorbent polymer for 1 hour, and
the gel strength (G') represents a horizontal gel strength of the super absorbent polymer measured using a rheometer, after absorbing and swelling a physiological saline solution (0.9 wt % sodium chloride aqueous solution) to the super absorbent polymer for 1 hour.

2. The super absorbent polymer of claim 1, wherein the super absorbent polymer has a CRC of 24 to 35 g/g.

3. The super absorbent polymer of claim 1, wherein the super absorbent polymer has an AUP of 22 to 27 g/g.

4. The super absorbent polymer of claim 1, wherein the water-soluble ethylenically unsaturated monomer includes at least one selected from the group consisting of anionic monomer; non-ionic, hydrophilic group-containing monomer, and amino group-containing unsaturated monomer.

5. The super absorbent polymer of claim 1, wherein the first cross-linked polymer includes a polymer in which the monomer is subjected to a crosslinking polymerization in the presence of at least one internal crosslinking agent selected form the group consisting of bis(meth)acrylamide of polyol having 8 to 12 carbon atoms, poly(meth)acrylate of polyol having 2 to 10 carbon atoms and poly(meth)acrylate having 2 to 10 carbon atoms.

6. The super absorbent polymer of claim 1, wherein it has a particle size of 150 to 850 μm.

7. A method for preparing a super absorbent polymer comprising the steps of:
carrying out a crosslinking polymerization of a water-soluble ethylenically unsaturated monomer having at least partially neutralized acidic groups in the presence of an internal crosslinking agent to form a hydrogel polymer including a first cross-linked polymer;
drying, pulverizing, and classifying the hydrogel polymer to form a base polymer powder having a gel strength (G') of 5,000 Pa or more;
adding hydrophobic inorganic particles having a water-contact angle of 50° or more on the base polymer powder; and
heat-treating the base polymer powder to which the hydrophobic inorganic particles are added, in the presence of a surface crosslinking liquid containing hydrophilic inorganic particles having a water-contact angle of 10° or less, and a surface crosslinking agent of an alkylene carbonate having 2 to 5 carbon atoms, to perform a surface crosslinking.

8. The method for preparing a super absorbent polymer of claim 7, wherein the water-soluble ethylenically unsaturated monomer includes at least one selected from the group consisting of anionic monomers of acrylic acid, methacrylic acid, maleic anhydride, fumaric acid, crotonic acid, itaconic acid, 2-acryloylethanesulfonic acid, 2-methacryloylethanesulfonic acid, 2-(meth)acryloylpropanesulfonic acid or 2-(meth)acrylamido-2-methylpropanesulfonic acid, and their salts; non-ionic, hydrophilic group-containing monomers of (meth)acrylamide, N-substituted (meth)acrylate, 2-hydroxyethyl(meth)acrylate, 2-hydroxypropyl(meth)acrylate, methoxypolyethylene glycol(meth)acrylate or polyethylene glycol (meth)acrylate; and amino group-containing unsaturated monomers of (N,N)-dimethylaminoethyl(meth)acrylate or (N,N)-dimethylaminopropyl(meth)acrylamide, and their quaternary product.

9. The method for preparing a super absorbent polymer of claim 7, wherein the internal crosslinking agent includes at least one selected form the group consisting of bis(meth)acrylamide having 8 to 12 carbon atoms, poly(meth)acrylate of polyol having 2 to 10 carbon atoms and poly(meth)acrylate having 2 to 10 carbon atoms.

10. The method for preparing a super absorbent polymer of claim 7, wherein the super absorbent polymer has a particle size of 150 to 850 µm.

11. The method for preparing a super absorbent polymer of claim 7, wherein the hydrophobic inorganic particles include at least one selected from the group consisting of silica particles, titania particles and zirconia particles, and the hydrophilic inorganic particles includes at least one selected from the group consisting of silica particles, titania particles, zirconia particles, and laponite particles.

12. The method for preparing a super absorbent polymer of claim 7, wherein the surface crosslinking step is carried out by subjecting to a heat treatment under the condition in which the temperature is raised from an initial temperature of 20° C. to 130° C. to a maximum temperature of 140° C. to 200° C. over a period of 10 minutes to 40 minutes, and the maximum temperature is maintained for 5 minutes to 80 minutes.

13. The super absorbent polymer of claim 4, wherein the anionic monomer is acrylic acid, methacrylic acid, maleic anhydride, fumaric acid, crotonic acid, itaconic acid, 2-acryloylethanesulfonic acid, 2-methacryloylethanesulfonic acid, 2-(meth)acryloylpropanesulfonic acid or 2-(meth)acrylamido-2-methylpropanesulfonic acid, or a salt thereof.

14. The super absorbent polymer of claim 4, wherein the non-ionic, hydrophilic group-containing monomer is (meth)acrylamide, N-substituted (meth)acrylate, 2-hydroxyethyl (meth)acrylate, 2-hydroxypropyl(meth)acrylate, methoxypolyethylene glycol(meth)acrylate or polyethylene glycol (meth)acrylate.

15. The super absorbent polymer of claim 4, wherein the amino group-containing unsaturated monomer is (N,N)-dimethylaminoethyl(meth)acrylate or (N,N)-dimethylaminopropyl(meth)acrylamide, or a quaternary product thereof.

* * * * *